United States Patent [19]

Gallo

[11] 4,206,778
[45] Jun. 10, 1980

[54] ROTARY VALVE ASSEMBLY HAVING A DUAL PURPOSE VALVE ELEMENT

[76] Inventor: William C. Gallo, 4602-27th Ave, South, St. Petersburg, Fla. 33711

[21] Appl. No.: 3,257

[22] Filed: Jan. 15, 1979

[51] Int. Cl.$^2$ .............................................. F16K 51/00
[52] U.S. Cl. .................................... 137/315; 251/310
[58] Field of Search ................. 251/309, 310; 137/315

[56] References Cited

U.S. PATENT DOCUMENTS

| | | | |
|---|---|---|---|
| 1,322,197 | 11/1919 | Molinari | 137/315 |
| 1,968,375 | 7/1934 | Curtis | 137/315 |
| 2,230,434 | 2/1941 | Porter | 137/315 |
| 2,796,079 | 6/1957 | Hugg | 137/315 |
| 3,314,644 | 4/1967 | Dwyer et al. | 251/309 |
| 3,971,402 | 7/1976 | Gallo | 251/309 |

FOREIGN PATENT DOCUMENTS 865173 4/1961 United Kingdom ..................... 137/315

Primary Examiner—William R. Cline
Assistant Examiner—H. Jay Spiegel
Attorney, Agent, or Firm—Robert Henderson

[57] ABSTRACT

The disclosed valve has a cylindrical, central, fluid conducting core fixed within a housing by a nut located in the housing in engagement with an integral flange of said core at the latter's inner end, an oscillatory valve element having a cylindrical wall, one end sleeve portion of which extends within a cylindrical space between the housing and the core to control fluid movement through the latter, and an opposite end sleeve portion of said cylindrical wall having an extremity formation in engagement with a knob for operating the valve, and said valve element being invertible during assembling or disassembling of the valve, in which inverted condition said extremity formation coacts with said nut to effect the latter's insertion or removal in the assembling or disassembling of the valve.

5 Claims, 5 Drawing Figures

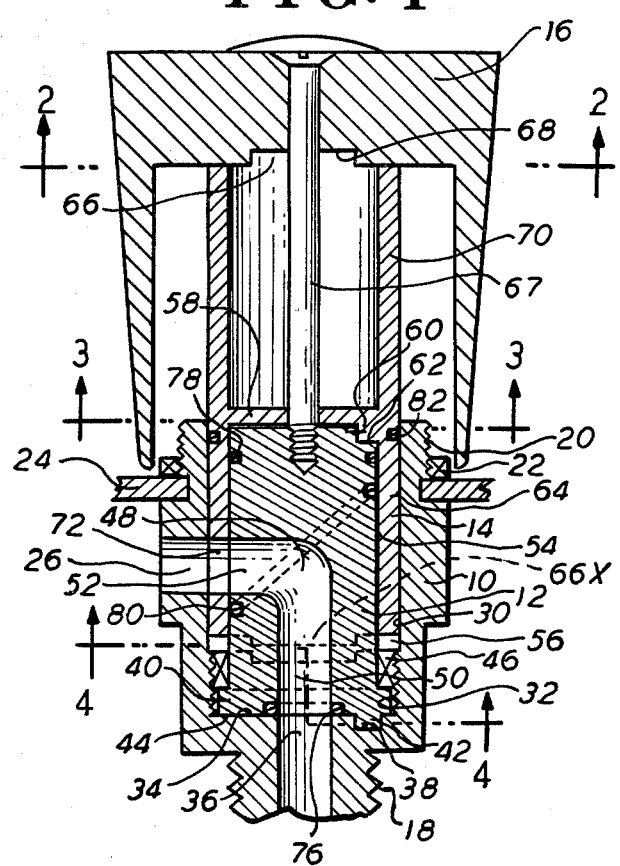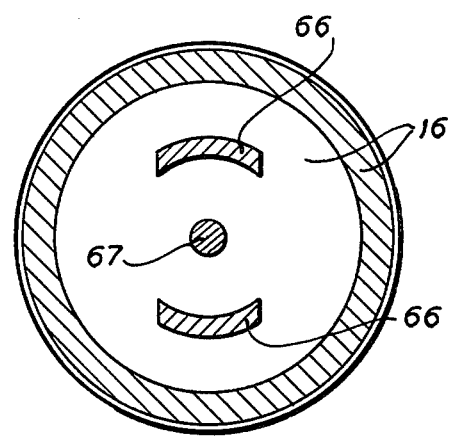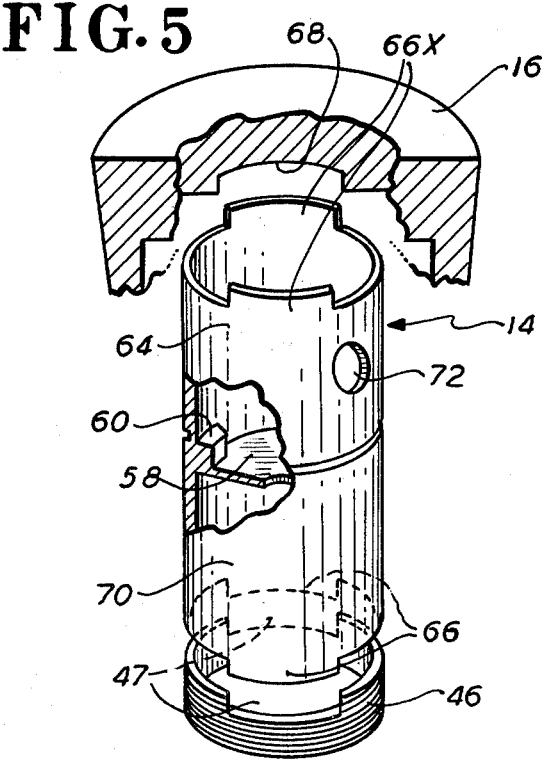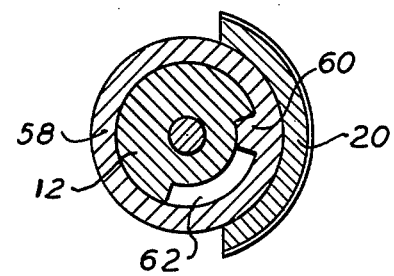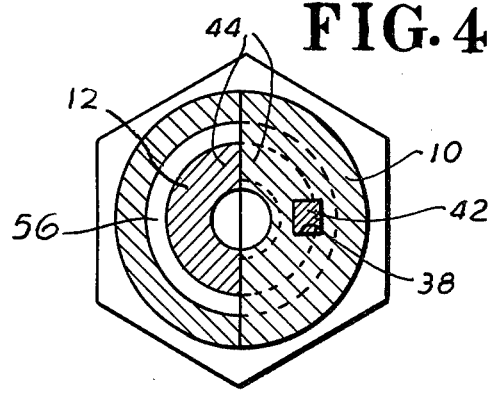

ROTARY VALVE ASSEMBLY HAVING A DUAL PURPOSE VALVE ELEMENT

BACKGROUND OF THE INVENTION

Although the valve disclosed in my prior U.S. Pat. No. 3,971,402 is very effective and satisfactory in operation, I have conceived that, with certain improvements, a valve which is somewhat similar in operation may be more economically produced and may be more easily assembled and disassembled in the manufacturing and servicing of the valve.

The principal object of this invention is to provide a novel valve wherein the mentioned production economy and ease of service are realized. As hereinafter detailed, that object is accomplished by providing a valve element which, during valving operation of the valve, functions to turn the valve on and off; the valve element serving, also, in an inverted position, as a specialized wrench for use in assembling the valve during its manufacture, or in disassembling and reassembling the valve when and if the valve needs servicing.

BRIEF DESCRIPTION OF THE DRAWING

FIG. 1 is a central, sectional view of a valve according to a preferred embodiment of this invention, showing the valve in open condition.

FIGS. 2 and 3 are cross sectional views, substantially on the lines 2—2 and 3—3, respectively, of FIG. 1.

FIG. 4 is a cross sectional view, substantially on the irregular line 4—4 of FIG. 1.

FIG. 5 is a perspective view of a cylindrical, oscillatory valve element of the disclosed assembly, shown in an inverted position in relation to a nut, for functioning as a wrench to tighten or loosen the nut in assembling or disassembling the valve.

DETAILED DESCRIPTION OF THE INVENTION

The principal parts of the valve of this invention are a housing 10, a stationary core 12 fixed within the housing, an oscillatory valve element 14, and a knob 16 for turning the valve element back and forth to operate the valve.

The housing 10 is preferably of brass or other material suiable for handling the fluid medium to be controlled by the valve and for enabling the valve to be connected to related piping and to be suitably mounted for convenient use. A tubular, lower end of the housing may be threaded as at 18 to facilitate connection of the valve assembly to input piping (not shown). The housing is threaded at its upper end, as at 20, to coact with a ring nut 22 for holding the valve in a suitable aperture in a counter top 24 (only fragmentally shown) or in or to some equivalent valve supporting means.

The housing 10 is formed with an output port 26 in a side wall thereof, said output port being suitably adapted for connection thereto of output piping or a suitable spout (neither such piping nor spout being shown). The housing is also formed with a relatively large axial bore 30, terminating at its lower end as an internally threaded portion 32. The lower end surface of the bore 30 is flat and annular, a central opening thereof partly defining an input port 36 of the valve.

The core 12 is substantially solid and generally cylindrical, and is formed with an integral, circular flange 40 at its lower end. The periphery of the flange 40 fits closely within the threaded portion 32 of the housing, thereby initiating concentricity of the core with respect to the bore 30 of the housing. An integral position-fixing lug 42 extends downwardly from a flat bottom surface 44 of the core, into a recess 38 in the housing, to prevent turning of the core within the housing.

A ring nut 46, formed with grooves 47, is threaded into the housing's internally threaded portion 32 and bears down tightly upon the flange 40 to firmly fix the core 12 in place within the housing. The nut 46, at its inside diameter, fits closely about the core 12 to fix the latter in a concentric position within the housing 10.

The core 12 is formed with an internal, elbow shaped fluid passage 48, the latter's lower end portion 50 being in direct fluid communication with the valve's input port 36, and its upper end portion 52 opening at the cylindrical surface 54 of the core, in alignment with the valve's output port 26. It should be noted that the diameter of the housing's bore 30 is greater than the diameter of the core 12, thereby providing a cylindrical space 56 therebetween. As hereinbefore indicated, the valve element performs the usual function of controlling fluid flow when it is in its upright position as in FIG. 1. However, when separated from other parts of the valve, it is useful, in an inverted position, as a wrench for use in assembling or disassembling in valve.

The valve element 14 is a relatively rigid, substantially open cylinder, being closed only by an approximately central, integral cross web 58. On the under side of said cross web is an integral lug 60 extending slidably into an arcuate track 62 formed in the upper end of the core 12; the valve element thereby being limited to manual turning between its open and closed positions.

The opposite ends of the valve element 14 are similarly formed with one or more tongues 66 and 66x (two being shown at each end). For normal operation of the valve, the tongues 66 closely fit within complemental grooves or slots 68 in the knob 16; thus, turning of the knob about its axis correspondingly turns the valve element 14. The knob is held in place by a long, headed bolt 67, threaded into the upper end of the core 12.

A lower sleeve portion 64 of the valve element extends downwardly with a close sliding fit into the annular space 56, between the core 12 and the housing 10, to a level below the output port 26. The lower sleeve portion 64 has a valving opening 72 therein which, in one angular or open position of the valve element 14, opens up a fluid connection between the core's fluid passage 48 and the valve's output port 26 to permit fluid movement through the valve. When the valve element 14 is turned, by means of the knob 16, to a different or closed position, the valve opening 72 is closed off between the core 12 and the housing 10.

In assembling the parts of the disclosed valve, the core 12 is inserted into the housing 10 with the core's flange 40 disposed downwardly. Then, the ring nut 46 is dropped into the space 56 between the housing and the core, after which the upper sleeve portion 70 of the valve element is inserted downwardly in the space 56, whereupon the valve element 14, in conjunction with the knob 16, is turned as a wrench, causing the tongues 66 of the sleeve portion 70 to coact with the slots 47 of the nut 46 to tighten the latter and thus firmly fix the core 12 within the housing 10. Reverse turning, of course, loosens the nut 46 if desired. The indicated participation of the knob 16, for wrench purposes, arises from coaction between the tongues 66x of the valve element 14 and the grooves 68 of the knob 16, as may be understood from FIG. 5.

The valve includes sealing "O" rings 76 and 78 seated within external circular grooves in the surface of the core 12, and an "O" ring 80 is stretched into an external oval groove of said core. The valve also includes a sealing "O" ring 82, seated within an external circular groove of the valve element 14. The indicated external dispositions of said "O" rings facilitates manufacture of the valve.

In disassembling of the valve, removal of the bolt 67 permits removal of the knob 16 and the valve element 14. The latter may then be upended and reinserted to enable the valve element and the knob to work together as wrench means to remove the nut 46 and the core 12 from the housing as already explained. Aided by the present description, a skilled artisan will readily understand fully the manner of assembling and disassembling the valve of this invention.

It should be understood that some disclosed details of the valve of this invention may be modified without, however, departing from the invention as hereinafter claimed.

I claim:

1. A rotary valve assembly comprising a housing formed with a cylindrical bore extending downwardly therewithin; a knob for operating the valve assembly; a core disposed in said bore with an outer cylindrical surface of the core uniformly spaced from said bore's surface to provide an intervening cylindrical space between the core and the bore, said core having a lower, integral, annular flange; a nut insertable in said intervening space and coacting with a threaded area of said bore and with said flange to hold said core in place in the housing; an oscillatory, cylindrical valve element having a lower sleeve portion slidable angularly within said intervening space, and having a valving opening coacting with fluid passages in said housing and core in approximately one angular position of said valve element to open the valve, said valve element having an upper sleeve portion, rigidly integral with said lower sleeve portion and having radial dimensions similar to said lower sleeve portion, and said upper sleeve portion being adapted, at its upper end, to coact with said knob to enable turning of the latter to turn the valve element back and forth between open and closed positions; and, in a non-valving capability condition of the valve, with said valve element inverted, said upper sleeve portion of the valve element and said nut being adapted to coact to tighten or loosen said nut in assembling or disassembling the valve.

2. A rotary valve assembly according to claim 1, said knob and said upper sleeve portion of the valve element having interengaging tongue and slot conformations causing said knob and valve element to turn in unison during operation of the valve; and said conformation of said upper sleeve portion and a conformation of said nut, which is substantially complemental to said conformation of said upper sleeve portion, constituting interengaging tongue and slot conformations enabling said valve element, in inverted position, to coact as a wrench with said nut.

3. A rotary valve assembly according to claim 2, the upper extremity of said upper sleeve portion being formed with an upwardly extending tongue, said knob being formed with a downwardly facing slot, and said nut being formed with an upwardly facing slot, and both said slots being complemental with respect to said tongue to coact separately therewith.

4. A rotary valve assembly according to claim 3, plural tongues being provided on said upper sleeve portion, and plural slots being provided in said knob and said nut, said slots being complemental to said tongues and so disposed in said knob and nut as to operatively register with said tongues when the valve element is used separately for cooperation with the knob and with the nut.

5. A rotary valve assembly according to claim 2, the lower extremity of said lower sleeve portion being formed with a downwardly extending tongue, operatively similar to said tongue of the upper sleeve portion in coaction with said slot of the knob, thereby adapting the knob to coact separately with said lower and upper sleeve portions either to operate the valve or to tighten or to loosen said nut.

* * * * *